United States Patent
Sasama

(10) Patent No.: US 8,681,362 B2
(45) Date of Patent: Mar. 25, 2014

(54) POSITION DETECTING APPARATUS, POSITION DETECTING METHOD, AND IMAGE FORMING APPARATUS

(75) Inventor: Kazuo Sasama, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 259 days.

(21) Appl. No.: 13/323,960

(22) Filed: Dec. 13, 2011

(65) Prior Publication Data

US 2012/0262756 A1 Oct. 18, 2012

Related U.S. Application Data

(60) Provisional application No. 61/475,442, filed on Apr. 14, 2011.

(51) Int. Cl.
*G06F 3/12* (2006.01)
*G06F 3/041* (2006.01)

(52) U.S. Cl.
USPC ............. 358/1.15; 358/434; 345/178

(58) Field of Classification Search
USPC .......... 358/1.1, 1.15, 400, 401, 434; 345/156, 345/157, 158, 173, 178
See application file for complete search history.

(56) References Cited

U.S. PATENT DOCUMENTS

| | | | | |
|---|---|---|---|---|
| 7,064,854 | B2* | 6/2006 | Idehara ..................... | 358/1.15 |
| 7,808,492 | B2* | 10/2010 | Yamauchi et al. ........... | 345/204 |
| 8,325,020 | B2* | 12/2012 | Izadi et al. .................. | 340/10.5 |
| 8,508,760 | B2* | 8/2013 | Sahashi ...................... | 358/1.14 |
| 2011/0261405 | A1* | 10/2011 | Ito et al. ..................... | 358/1.15 |
| 2011/0294417 | A1* | 12/2011 | Mine et al. .................. | 455/41.1 |
| 2011/0294433 | A1* | 12/2011 | Matsubara et al. .......... | 455/41.3 |
| 2013/0040567 | A1* | 2/2013 | Matsubara et al. .......... | 455/41.1 |
| 2013/0109310 | A1* | 5/2013 | Mine et al. .................. | 455/41.1 |

FOREIGN PATENT DOCUMENTS

| | | |
|---|---|---|
| JP | 2008-123476 | 5/2008 |
| JP | 2009-059279 | 3/2009 |
| JP | 2010-045683 | 2/2010 |
| JP | 2010-049169 | 3/2010 |
| JP | 2010-128975 | 6/2010 |
| JP | 2010-239645 | 10/2010 |

* cited by examiner

*Primary Examiner* — Thomas D Lee
(74) *Attorney, Agent, or Firm* — Amin, Turocy & Watson, LLP

(57) ABSTRACT

According to one embodiment, a position detecting apparatus including a display device includes three receiving units provided on the rear surface side of the display device and configured to receive a radio signal from a device provided on the front surface side of the display device, an intensity detecting device configured to detect the intensity of the radio signal from the device received by the receiving units, and a control unit configured to calculate the position of the device from the intensity of the radio signal received by the receiving units and display, on the display device, a guide screen for aligning the device with specific one receiving unit.

19 Claims, 16 Drawing Sheets

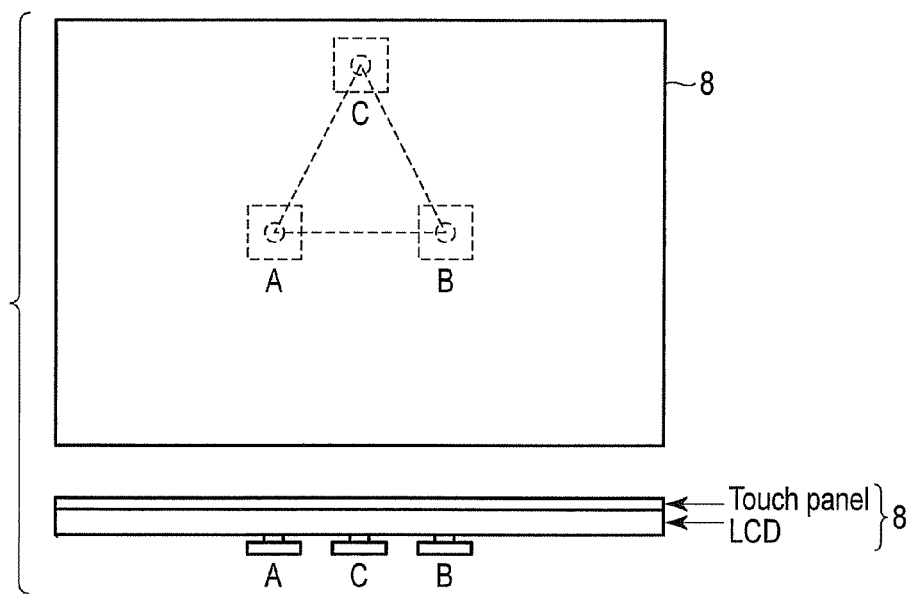
F I G. 5
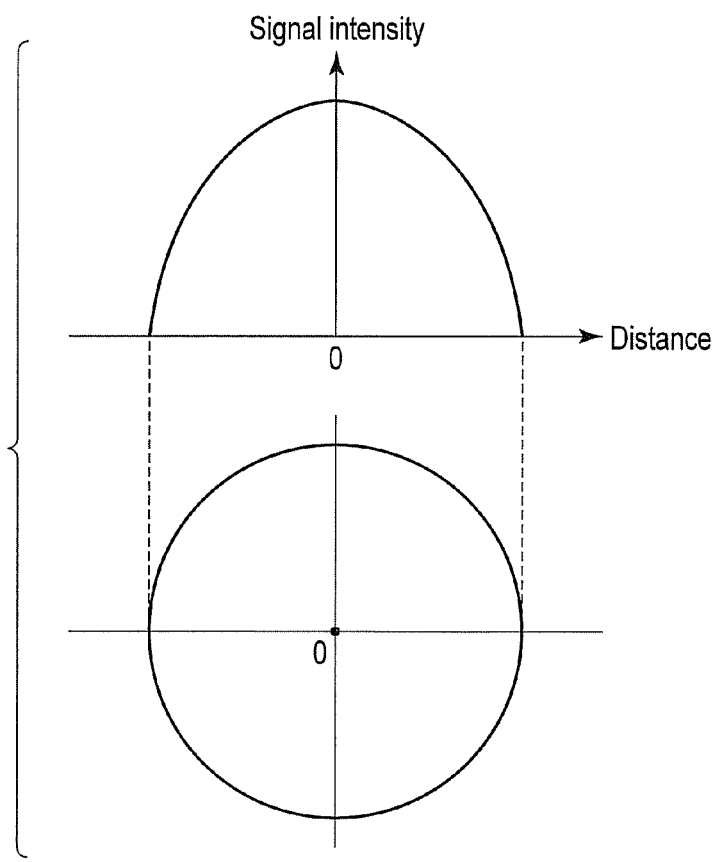
F I G. 6

| No. | Case | Device position | Display pattern |
|---|---|---|---|
| 1 | None of sensors detects coupler | Device position is unknown | Pattern No.1 |
| 2 | One sensor detects coupler | Device position is present on circumference | Pattern No.2 |
| 3 | Two sensors detect coupler | (3-1) Two device positions are calculated | Pattern No.3 |
| | | (3-2) One device position is calculated | Pattern No.4 |
| 4 | Three sensors detect coupler | One device position is calculated | Pattern No.4 |

F I G. 7

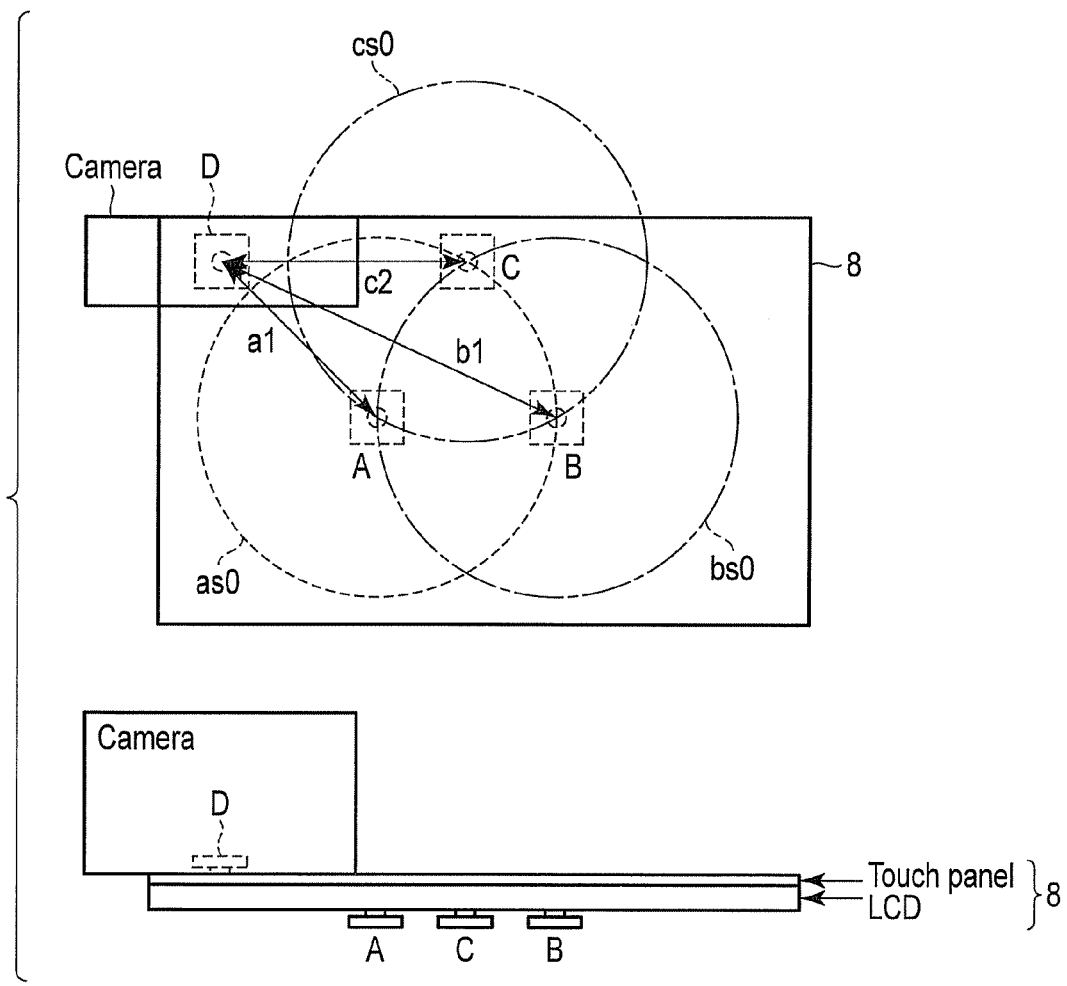
F I G. 8
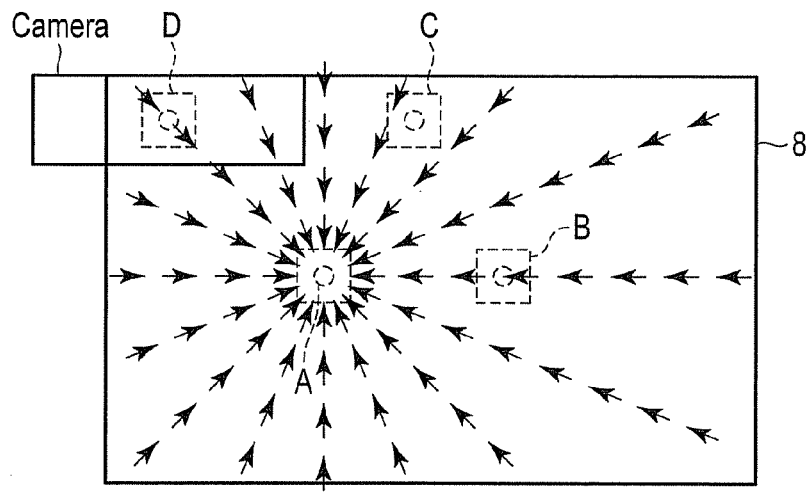
F I G. 9

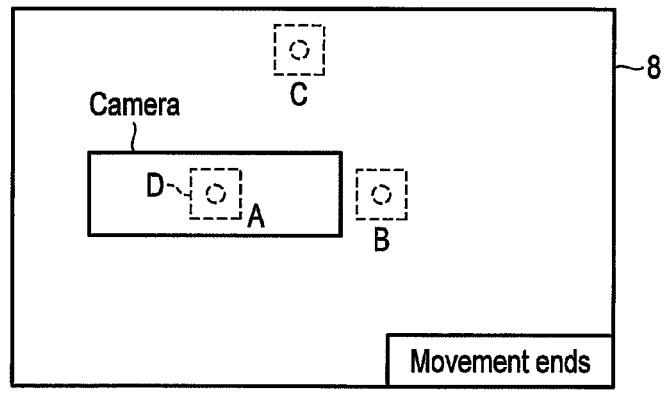
F I G. 16
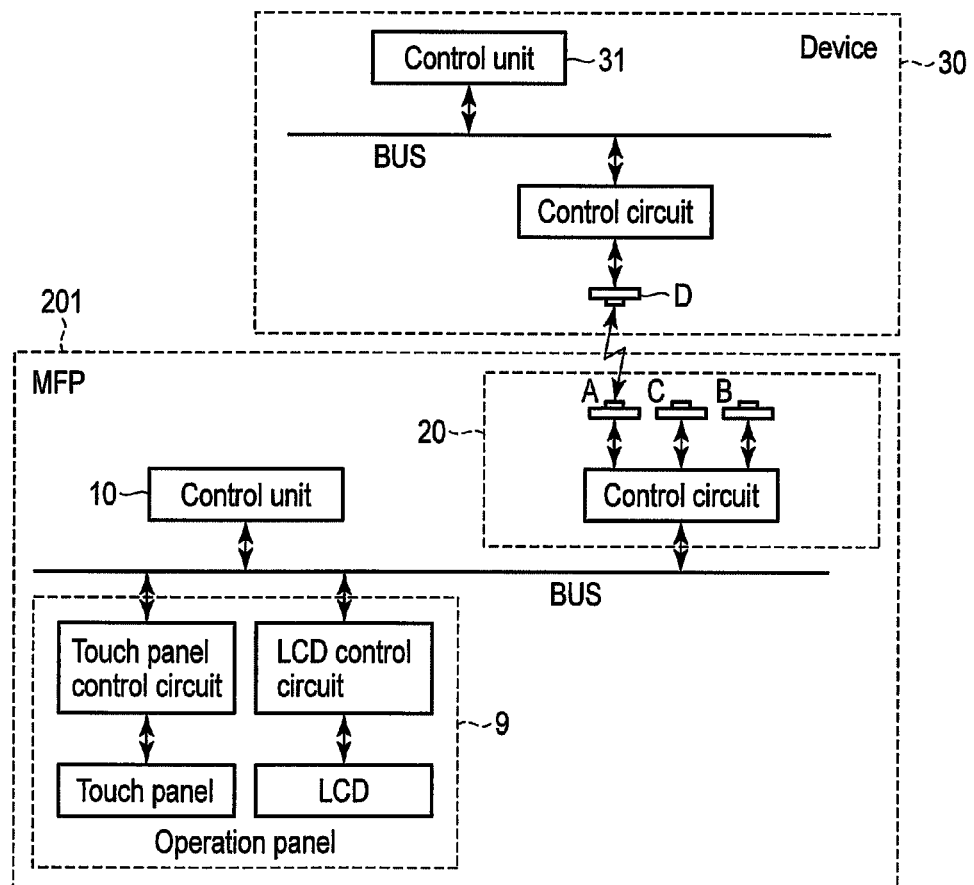
F I G. 17

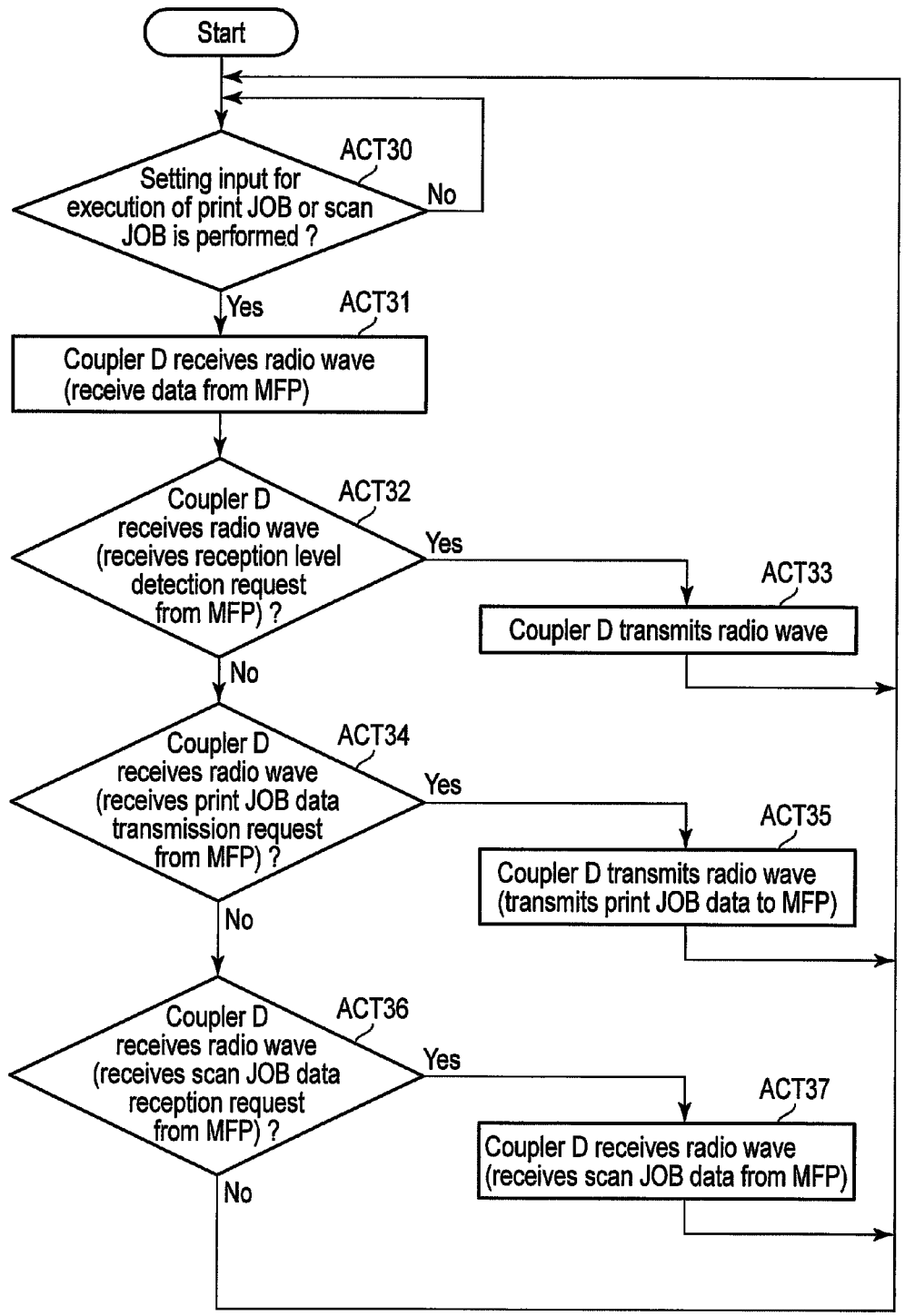
F I G. 21

POSITION DETECTING APPARATUS, POSITION DETECTING METHOD, AND IMAGE FORMING APPARATUS

CROSS-REFERENCE TO RELATED APPLICATIONS

This application is based upon and claims the benefit of U.S. Provisional Application No. 61/475,442, filed on Apr. 14, 2011; the entire contents of which are incorporated herein by reference.

FIELD

Embodiments described herein relate generally to a position detecting apparatus, a position detecting method, and an image forming apparatus.

BACKGROUND

In recent years, a standard of short-range wireless communication for increasing communication speed and increasing a data transmission amount per unit time is examined. In the short-range wireless communication based on this standard, a coupler that transmits and receives a radio signal is aligned with a coupler of a communication partner apparatus to execute wireless communication. In the short-range wireless communication, for example, communication can be performed if a distance between the couplers is within a predetermined distance. Further, a transfer rate can be increased by aligning the couplers in positions where field intensity of a radio signal (a radio wave) increases.

Therefore, in order to transfer a large amount of data in a short time, a user needs to set the positions of couplers of electric apparatuses, which execute the short-range wireless communication, in appropriate positions where field intensity increases and continue to maintain that state.

However, for example, if an electronic apparatus, which performs the short-range wireless communication, has a characteristic shape or if the electronic apparatus is an apparatus having a large size, it is difficult to visually align couplers between the electronic apparatus and a communication partner electronic apparatus.

Therefore, there is a need for a technique for enabling easy positioning in positions where the short-range wireless communication is stably executed.

BRIEF DESCRIPTION OF THE DRAWINGS

FIG. 5 is an exemplary diagram of coupler attaching positions of the MFP according to the first embodiment;
FIG. 6 is an exemplary diagram of a change in detection signal intensity that occurs if the position of a coupler of a device is changed near a coupler of the MFP according to the first embodiment;
FIG. 7 is an exemplary diagram of cases in which the position of the coupler of the device is detected by the MFP according to the first embodiment;
FIG. 8 is an exemplary diagram of a first case in which the position of the coupler of the device is detected by the MFP according to the first embodiment;
FIG. 9 is an exemplary diagram of a first movement pattern displayed on a display unit of the MFP according to the first embodiment;
FIG. 16 is an exemplary diagram of a display pattern in a movement end state displayed on the display unit of the MFP according to the first embodiment;
FIG. 17 is an exemplary block diagram of the configuration of a control system for short-range wireless communication between the MFP according to the first embodiment and the device;
FIG. 21 is an exemplary flowchart for explaining a short-range wireless communication operation procedure of the device in the first embodiment.

DETAILED DESCRIPTION

In general, according to one embodiment, a position detecting apparatus including a display device includes: three receiving units provided on the rear surface side of the display device and configured to receive a radio signal from a device provided on the front surface side of the display device; an intensity detecting device configured to detect the intensity of the radio signal from the device received by the receiving units; and a control unit configured to calculate the position of the device from the intensity of the radio signal received by the receiving units and display, on the display device, a guide screen for aligning the device with specific one receiving unit.

First Embodiment

An image forming apparatus implemented with a technique for enabling easy positioning in positions where short-range wireless communication is stably executed will be hereinunder explained.

An MFP (Multi Function Peripheral), which is one example of the image forming apparatus, means a digital complex machine for not only scanning, reading, and copying an image at designated resolution and in a designated size but also comprehensively utilizing functions of various office machines such as an image receiving function by facsimile, an image receiving function by email, and a printed image receiving function by network.

Figure 1:
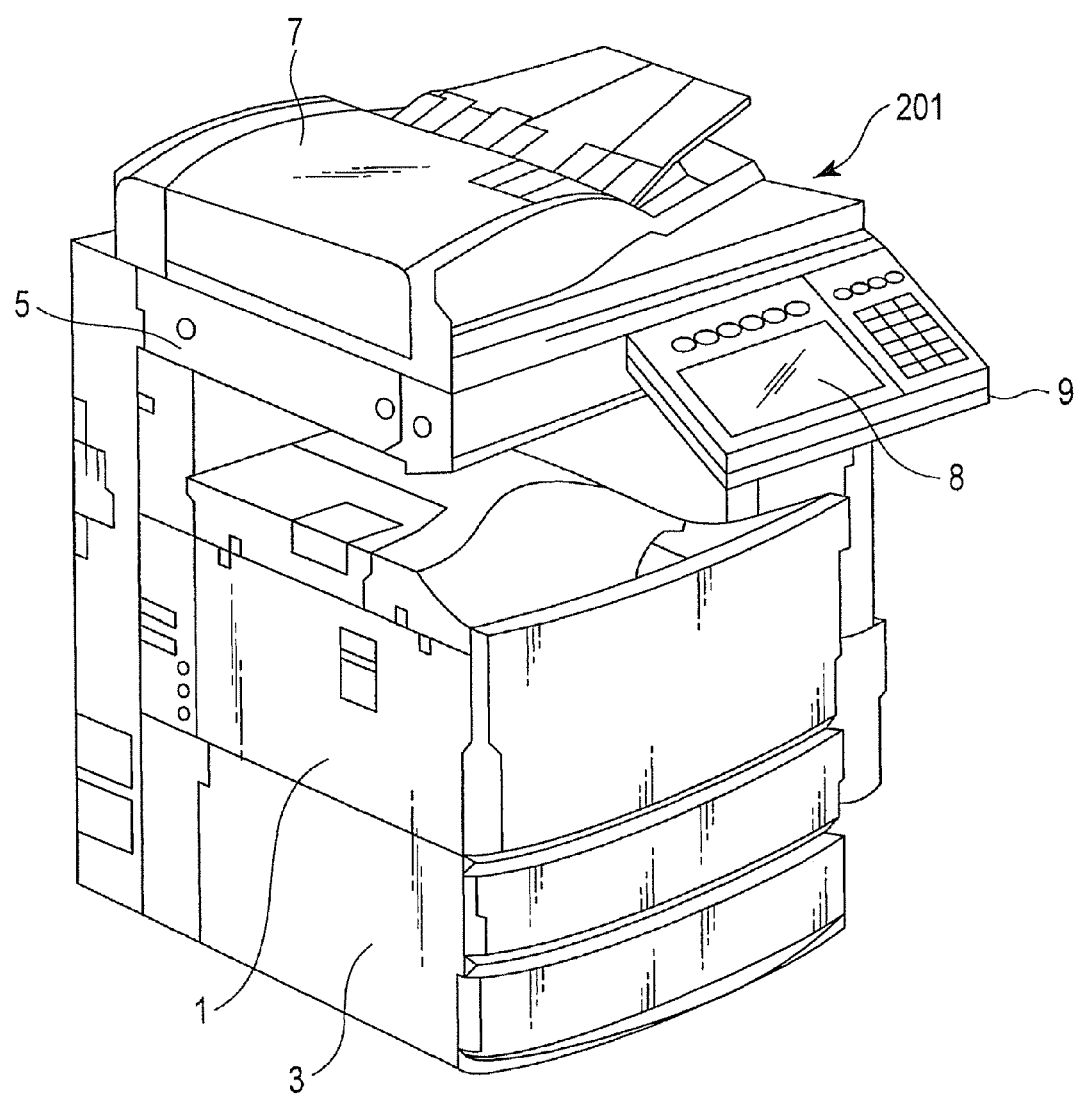
FIG. 1 is an exemplary perspective view of a schematic shape of an MFP according to a first embodiment.

FIG. 1 is an exemplary perspective view of a schematic shape of an MFP 201 according to a first embodiment.

The MFP 201 includes a printing unit 1, a sheet tray 3, a scanning unit 5, an auto feed unit 7, and an operation panel 9.

The printing unit 1 outputs image information as an output image called, for example, hardcopy or printout. The sheet tray 3 feeds an output medium, which is a sheet of an arbitrary size used for image output, to the printing unit 1. The scanning unit 5 captures image information from an original document as image data. The auto feed unit 7 delivers the original document, for which reading ends, from a reading position to a discharge position and leads the next original document to the reading position. The operation panel 9 is an instruction input unit for instructing the operation of the MFP 201 such as the start of image formation in the printing unit 1 and the start of reading of image information of an original document by the scanning unit 5. The operation panel 9 includes a display unit 8 for inputting an instruction and displaying information to an operator.

Further, the MFP 201 can be connected to a not-shown network or a communication line to receive image data by facsimile, email, or the like.

Figure 2:
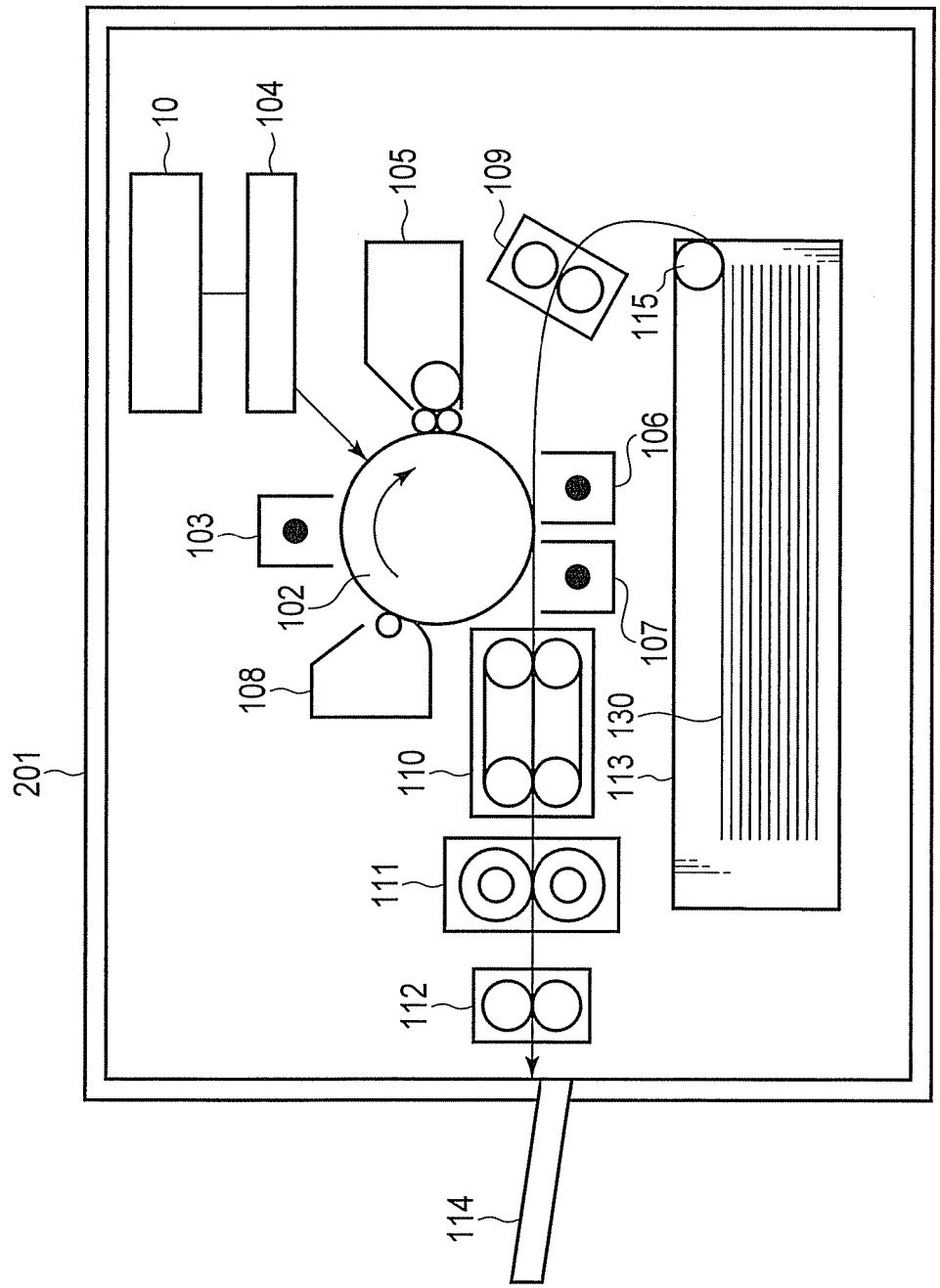
FIG. 2 is an exemplary block diagram of the configuration of a copy function of the MFP according to the first embodiment.

FIG. 2 is an exemplary block diagram of the configuration of a copy function of the MFP 201 according to the first embodiment.

The MFP 201 includes a control unit 10, a photoconductive drum 102, a charging device 103, a scanning and exposing unit 104, a developing device 105, a transfer charger 106, a peeling charger 107, a cleaner 108, a paper feeding unit 109, a sheet conveying unit 110, a fixing device 111, a paper discharge unit 112, and a paper discharge tray 114.

The photoconductive drum 102 rotates in a sub-scanning direction, which is a circumferential direction of the photoconductive drum 102. The charging device 103 is arranged near the circumference of the photoconductive drum 102. The charging device 103 uniformly charges a surface of the photoconductive drum 102. The scanning and exposing unit 104 turns on and off a semiconductor laser in the scanning and exposing unit 104 according to an image signal while scanning the semiconductor laser. A laser beam emitted from the semiconductor laser is changed to light for scanning in a main scanning direction, which is a rotation axis direction of the photoconductive drum 102, by a deflector such as a polygon mirror. The laser beam is irradiated on the photoconductive drum 102 by an optical system such as a lens. When the laser beam is irradiated on the charged photoconductive drum 102, the potential in an irradiated region falls and an electrostatic latent image is formed.

The developing device 105 applies a developer to the photoconductive drum 102 to form a toner image on the photoconductive drum 102. On the other hand, the sheet tray 3 is provided at the bottom of the MFP 201. A paper feeding roller 115 separates sheets 130 in the sheet tray 3 one by one and delivers the sheet 130 to the paper feeding unit 109. The paper feeding unit 109 feeds the sheet 130 to a transfer position of the photoconductive drum 102. The transfer charger 106 transfers the toner image onto the fed sheet 130. The peeling charger 107 peels the sheet 130 off the photoconductive drum 102.

The sheet 130 having the toner image transferred thereon is conveyed by the sheet conveying unit 110. The fixing device 111 fixes the toner image on the sheet 130. The paper discharge unit 112 discharges the sheet 130 having an image printed thereon onto the paper discharge tray 114.

After the transfer of the toner image onto the sheet 130 ends, a residual toner on the photoconductive drum 102 is removed by the cleaner 108. The photoconductive drum 102 returns to an initial state and changes to a standby state for the next image formation.

The MFP 201 continuously performs the image forming operation by repeating the process operation explained above.

Figure 3:
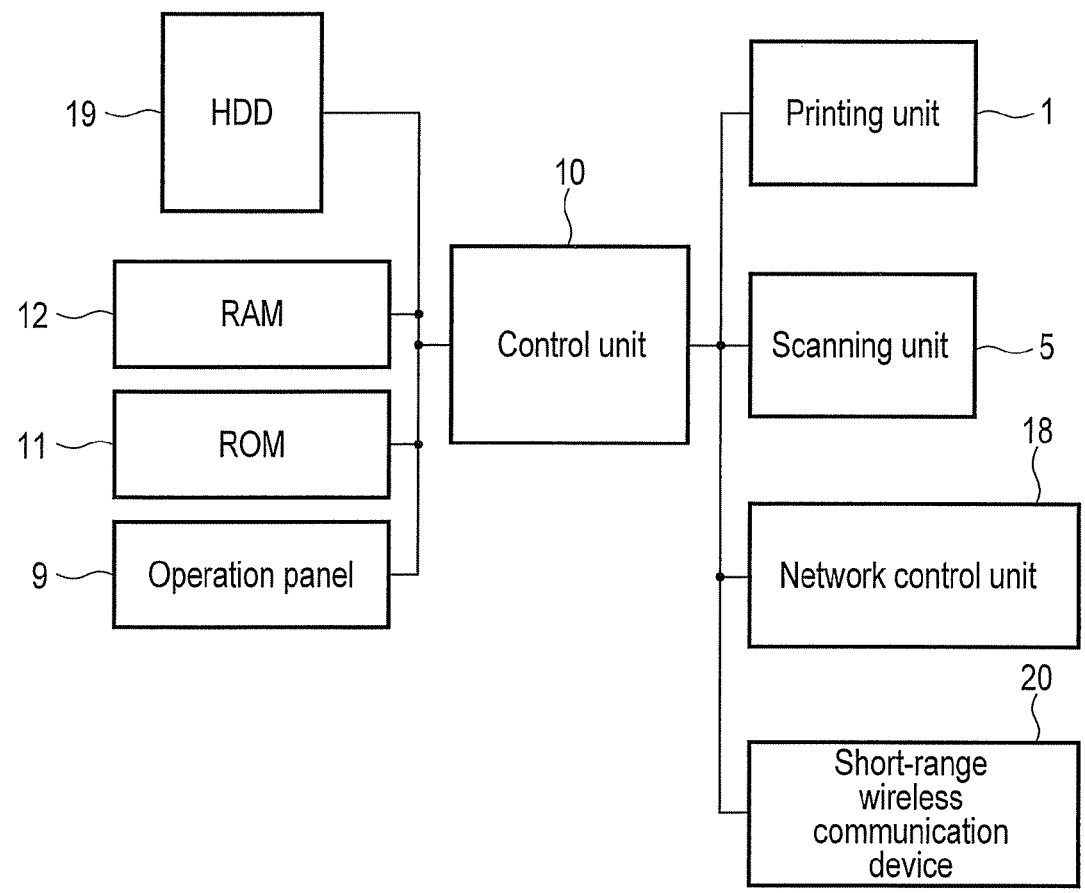
FIG. 3 is an exemplary block diagram of the configuration of a control system of the MFP according to the first embodiment.

FIG. 3 is an exemplary block diagram of the configuration of a control system of the MFP 201 according to the first embodiment.

The MFP 201 further includes the control unit 10, a ROM 11, a RAM 12, a network control unit 18, an internal storage device (HDD) 19, and a short-range wireless communication device 20 together with the printing unit 1 (including the sheet tray 3), the scanning unit 5, and the operation panel 9 (including the LCD 8). These units are connected via a system bus.

The control unit 10 controls the units of hardware connected via the system bus. The ROM 11 has stored therein various control programs necessary for the MFP 201 to operate. The RAM 12 is a buffer memory that temporarily stores data generated during execution of the control programs.

The network control unit 18 is an interface for performing exchange of information via a network such as the Internet. The HDD 19 is a nonvolatile storage medium set on the inside of the MFP 201.

The short-range wireless communication device 20 executes exchange of information by the short-range wireless communication between the short-range wireless communication device 20 and an external device.

Figure 4:
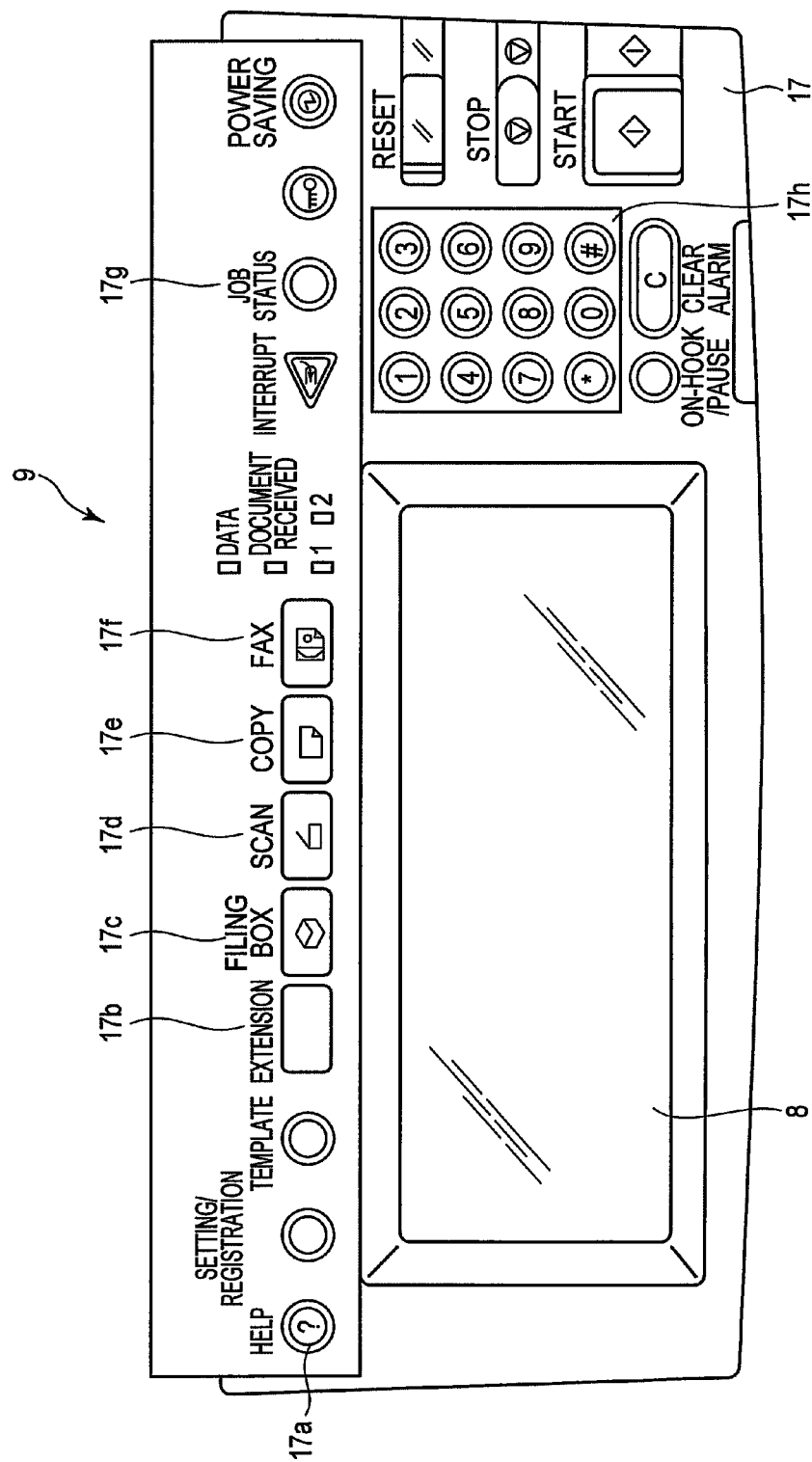
FIG. 4 is an exemplary external view of an operation panel provided in the MFP according to the first embodiment.

FIG. 4 is an exemplary external view of the operation panel 9 provided in the MFP 201 according to the first embodiment. A user performs setting and check of the MFP 201 via the operation panel 9. The operation panel 9 includes the display unit 8 and an operation unit 17. The display unit 8 includes a touch panel. A state of the MFP 201, an operation procedure, various instructions to the user, and the like are displayed on the display unit 8. The operation unit 17 includes various operation buttons for operating the MFP 201.

As keys for calling screens for selecting and setting functions, a help button 17a, a function extension button (an extension button) 17b, a filing box button 17c, a scan button 17d, a copy button 17e, a facsimile button 17f, a status check button 17g, and the like are arranged. Besides, numeric keypad 17h and the like for inputting a setting value and checking information are also arranged.

Functions of main buttons among these operation buttons are explained. The help button 17a is used in inquiring, for example, what kind of operation should be performed next. The extension button 17b is operated when an extended function is used. The filing box button 17c is used when stored image data is extracted. The scan button 17d is used when a scan function is used. The copy button 17e is used when a copy function is used. The facsimile button 17f is used when a facsimile function is used. The status check button 17g is used when an execution status of the MFP 201 is displayed. The numeric keypad 17h is used when a number is input.

FIG. 5 is an exemplary diagram of coupler attaching positions of the MFP 201 according to the first embodiment. Three couplers A, B, and C are provided on a rear surface of the display unit 8 of the operation panel 9. A diagram in an upper part of FIG. 5 is a plan view of the display unit 8. A diagram in a lower part of FIG. 5 is a sectional view of the display unit 8. The three couplers A, B, and C are provided on a surface on the opposite side of a surface opposed to a touch panel of an LCD (Liquid Crystal Device).

The three couplers A, B, and C are arranged in order to detect the position of a coupler D of a short-range wireless communication device mounted on a device 30. A detection method is explained later. The number of couplers provided in the display unit 8 only has to be three or more in order to detect the position of the coupler D of the device 30. The three couplers A, B, and C are arranged to direct the directivity of an antenna to the touch panel side of the display unit 8.

In FIG. 5, the three couplers A, B, and C are arranged at an equal distance from one another. However, the three couplers A, B, and C only have to be arranged to form a triangle, although not arranged at the equal distance. In FIG. 5, the couplers A and B are arranged in the center of a display screen and the coupler C is provided near one side of the display screen. This is because a position for detecting the coupler D is set to be the position of the coupler A or B near the center of the display unit 8 such that detection of the coupler D of the device 30 can be easily performed.

Subsequently, a method with which the MFP 201 according to the first embodiment detects the position of the coupler D of the device 30 is explained.

FIG. 6 is an exemplary diagram of a change in detection signal intensity that occurs if the position of the coupler D of the device 30 is changed near the coupler A of the MFP 201 according to the first embodiment.

The ordinate of a coordinate shown in an upper part of FIG. 6 represents signal intensity detected by the coupler A and the abscissa of the coordinate represents a distance between the coupler A and the coupler D. The signal intensity increases as the coupler D moves closer to the coupler A. The signal intensity is the highest when the position of the coupler D coincides with the position of the coupler A. When the distance between the coupler A and the coupler D is larger than a predetermined value, the coupler A cannot detect a signal from the coupler D.

A plan view of a range in which the coupler A can detect the coupler D is shown in a lower part of FIG. 6. The inside of a concentric circle around the position of the coupler A is an area in which the coupler A can detect the coupler D, i.e., a detectable area. The coupler A can calculate the distance between the coupler A and the coupler D on the basis of a characteristic described in the upper part of FIG. 6 by detecting signal intensity. In other words, the position of the coupler D can be calculated as a position on the circumference of the concentric circle around the position of the coupler A.

FIG. 7 is an exemplary diagram of cases in which the position of the coupler D of the device 30 is detected by the MFP 201 according to the first embodiment.

In a case 1, none of the three couplers A, B, and C detects the coupler D. At this point, the position of the coupler D is unknown. Therefore, the MFP 201 displays a first movement pattern on the display unit 8 to move the coupler D to a desired position.

In a case 2, one coupler (e.g., the coupler A) among the three couplers A, B, and C detects the coupler D. At this point, the position of the coupler D is on the concentric circuit around the position of the coupler A. Therefore, the MFP 201 displays a second movement pattern on the display unit 8 to move the coupler D to the desired position.

In a case 3, two couplers (e.g., the couplers A and B) among the three couplers A, B, and C detect the coupler D. At this point, the position of the coupler D is present in intersection positions of the concentric circle around the position of the coupler A and a concentric circle around the position of the coupler B. In the case 3, a case (3-1) and a case (3-2) are possible.

In the case (3-1), the two intersections are present outside a detection range of the coupler C. In other words, the coupler D is present in one of the two intersections. Therefore, the MFP 201 displays a third movement pattern on the display unit 8 to move the coupler D to the desired position.

In the case (3-2), one of the two intersections is present in the detection range of the coupler C. In other words, the coupler D is calculated as one point outside the detection range of the coupler C of the two intersections. Therefore, the MFP 201 displays a fourth movement pattern on the display unit 8 to move the coupler D to the desired position.

In a case 4, all the three couplers A, B, and C detect the coupler D. In other words, the coupler D is calculated as one point. Therefore, the MFP 201 displays the fourth movement pattern on the display unit 8 to move the coupler D to the desired position.

The cases are explained in detail.

FIG. 8 is an exemplary diagram of the first case in which the position of the coupler D of the device 30 is detected by the MFP 201 according to the first embodiment.

In FIG. 8, distances between the coupler D of a camera, which is the device 30, and the couplers A, B, and C are respectively a1, b1, and c1. Detectable areas of the couplers A, B, and C are respectively represented by concentric circles of a dotted line as0, an alternate long and short dash line bs0, and an alternate long and two short dashes line cs0. The position of the coupler D of the camera, which is the device 30, is absent in the detectable areas of the couplers A, B, and C. In other words, the couplers A, B, and C cannot detect the position of the coupler D.

FIG. 9 is an exemplary diagram of the first movement pattern displayed on the display unit 8 of the MFP 201 according to the first embodiment.

A figure indicating a target value is displayed in the position of the coupler A that is a movement target position. Arrows are displayed from the entire circumference of 360 degrees toward the movement target position. The user can easily set the coupler D in the target position by moving the camera in the directions of the arrows. Since it is unnecessary to bring the camera and the display unit 8 into contact with each other, the user can also visually recognize arrows displayed under the camera.

Figure 10:
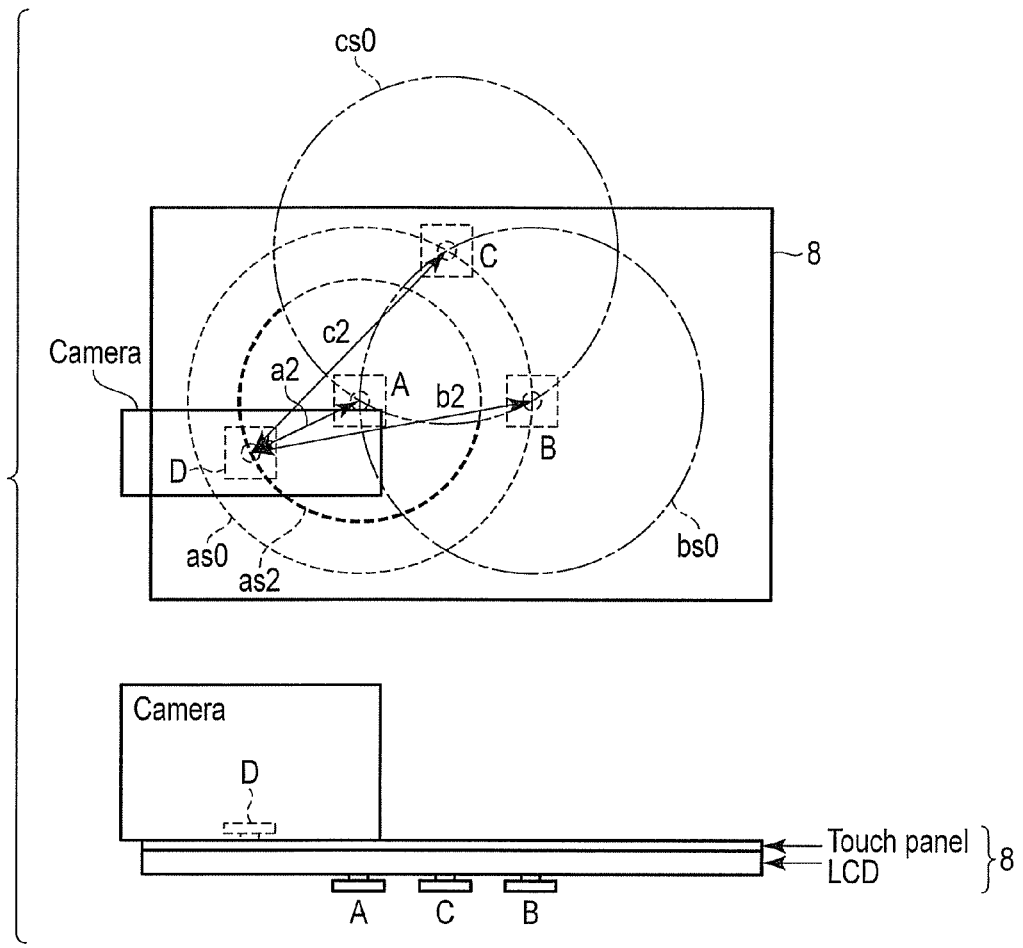
FIG. 10 is an exemplary diagram of a second case in which the position of the coupler of the device is detected by the MFP according to the first embodiment.

FIG. 10 is an exemplary diagram of the second case in which the position of the coupler D of the device 30 is detected by the MFP 201 according to the first embodiment.

In FIG. 10, the distances between the coupler D of the camera, which is the device 30, and the couplers A, B, and C are respectively a2, b2, and c2. The detectable areas of the couplers A, B, and C are respectively represented by concentric circles of the dotted line as0, the alternate long and short dash line bs0, and the alternate long and two short dashes line cs0. The position of the coupler D of the camera, which is the device 30, is present in the detectable area of the coupler A but is absent in the detectable areas of the couplers B and C. In other words, only the coupler A can detect the position of the coupler D. The position of the coupler D detected by the coupler A is present on a concentric circle represented by a thick dotted line as2. (The coupler D is absent in a portion overlapping the detectable areas of the couplers B and C.)

Figure 11:
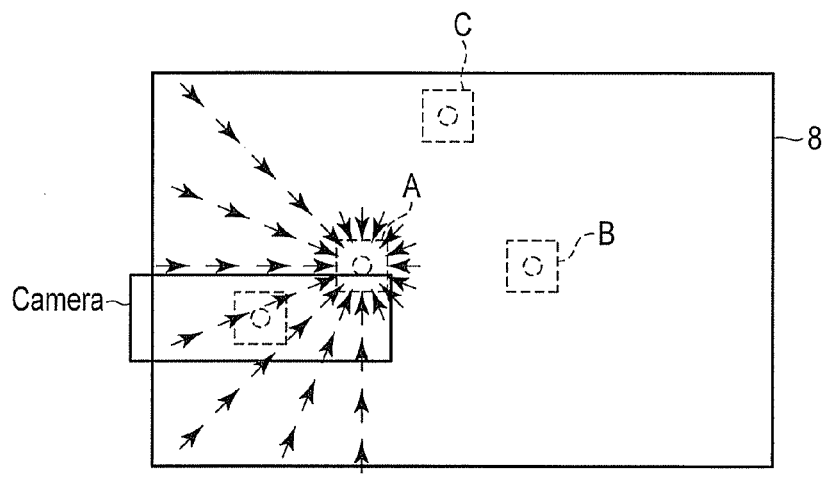
FIG. 11 is an exemplary diagram of a second movement pattern displayed on the display unit of the MFP according to the first embodiment.

FIG. 11 is an exemplary diagram of the second movement pattern displayed on the display unit 8 of the MFP 201 according to the first embodiment.

The figure indicating the target value is displayed in the position of the coupler A, which is a movement target position. Arrows are displayed toward the movement target position. The arrows are displayed in an area of a fan shape having a center angle smaller than 360 degrees where the coupler D is considered to be present. The user can easily set the coupler D in the target position by moving the camera in the directions of the arrows. Since it is unnecessary to bring the camera and the display unit 8 into contact with each other, the user can also visually recognize arrows displayed under the camera.

Figure 12A:
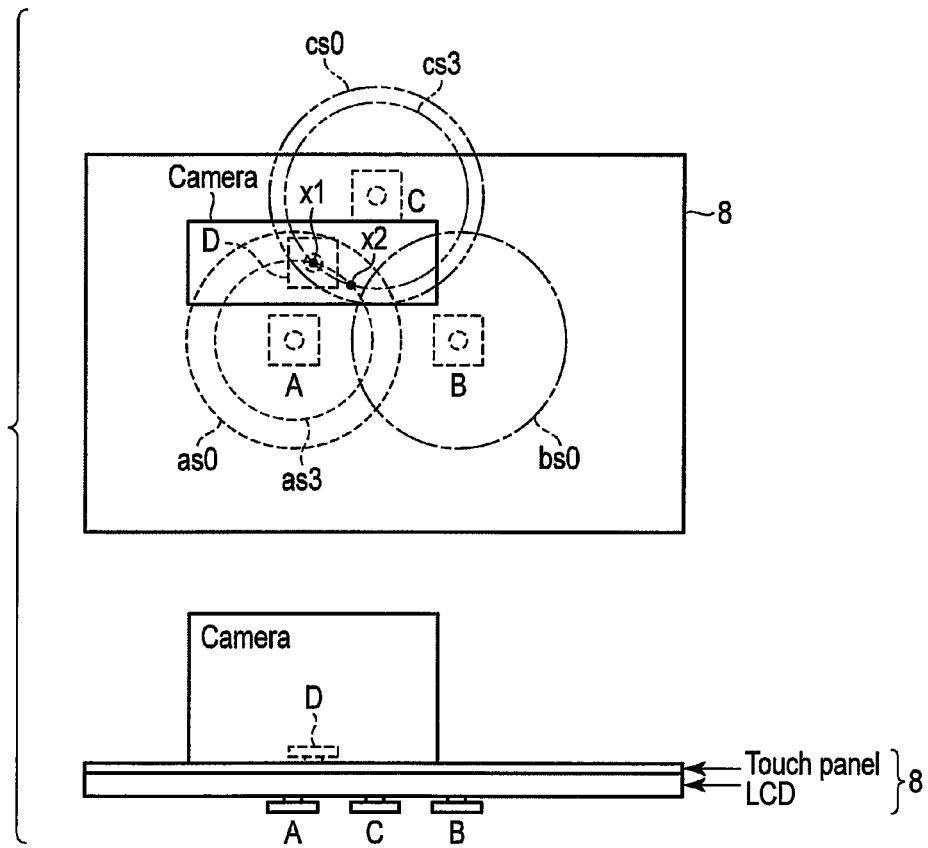
FIG. 12A is an exemplary diagram of a third case in which the position of the coupler of the device is detected by the MFP according to the first embodiment.
Figure 12B:
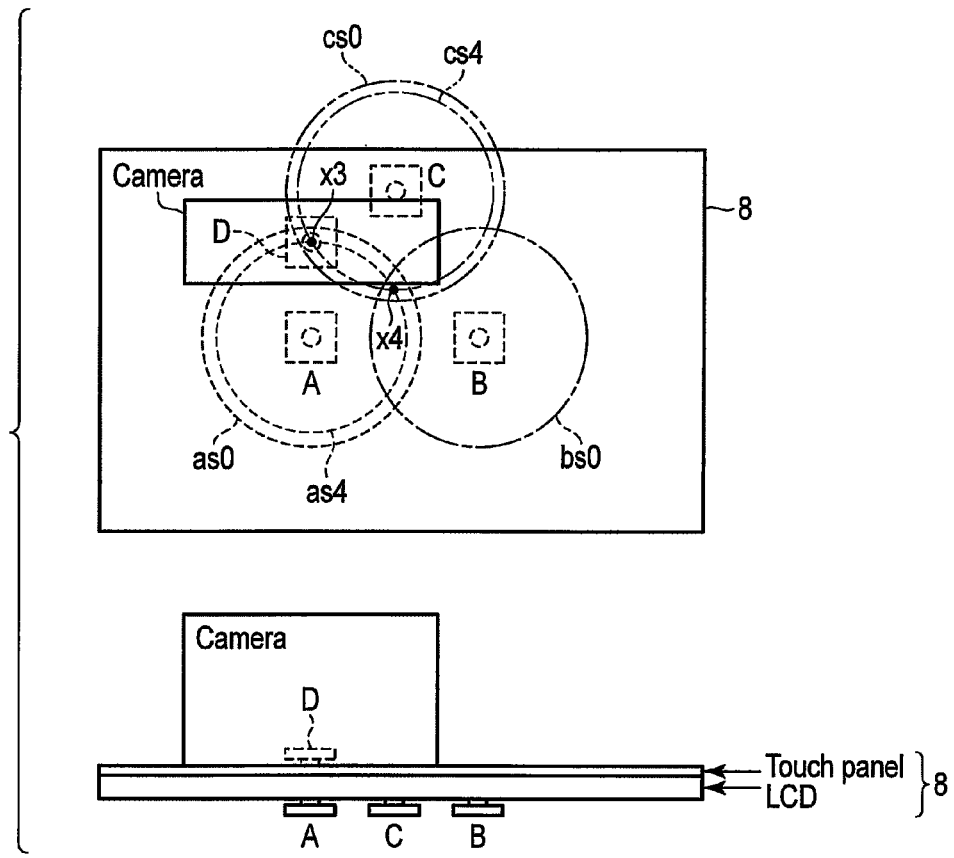
FIG. 12B is an exemplary diagram of the third case in which the position of the coupler of the device is detected by the MFP according to the first embodiment.

FIGS. 12A and 12B are exemplary diagrams of the third case in which the position of the coupler D of the device 30 is detected by the MFP 201 according to the first embodiment.

In FIG. 12A, the detectable areas of the couplers A, B, and C are respectively represented by concentric circles of the dotted line as0, the alternate long and short dash line bs0, and the alternate long and two short dashes line cs0. The position of the coupler D of the camera, which is the device 30, is present in the detectable areas of the couplers A and C but is absent in the detectable area of the coupler B. In other words, the coupler A and the coupler C can detect the position of the coupler D. The position of the coupler D is present at an intersection x1 on concentric circles represented by a thin dotted line as3 and an alternate long and two short dashes line cs3 and is absent in the detectable area of the coupler B. Another intersection x2 is also absent in the detectable area of the coupler B. This is equivalent to the case (3-1).

Figure 13:
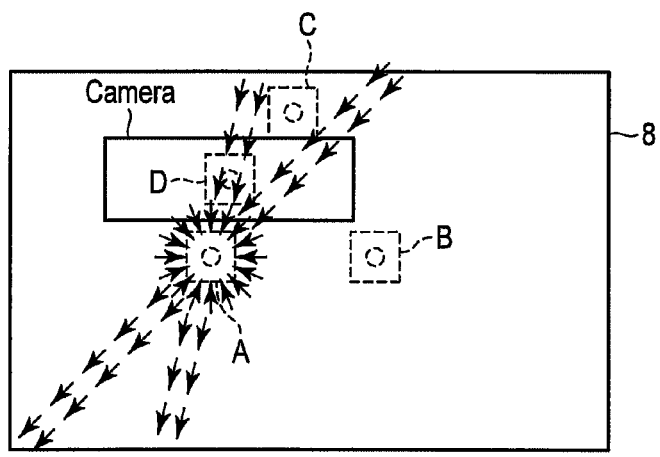
FIG. 13 is an exemplary diagram of a third movement pattern displayed on the display unit of the MFP according to the first embodiment.

FIG. 13 is an exemplary diagram of the third movement pattern displayed on the display unit 8 of the MFP 201 according to the first embodiment.

The third movement pattern is a movement pattern of the case (3-1) in which two positions are calculated as the position of the coupler D. The figure indicating the target value is displayed in the position of the coupler A, which is a movement target position. Arrows are displayed toward the movement target position. The arrows are displayed along lines respectively connecting two points (x1, x2), at which the coupler D is considered to be present, and the target position. The user can easily set the coupler D in the target position by moving the camera in the directions of the arrows. Since it is unnecessary to bring the camera and the display unit 8 into contact with each other, the user can also visually recognize arrows displayed under the camera.

In FIG. 12B, the detectable areas of the couplers A, B, and C are respectively represented by concentric circles of the dotted line as0, the alternate long and short dash line bs0, and the alternate long and two short dashes line cs0. The position of the coupler D of the camera, which is the device 30, is present in the detectable areas of the couplers A and C but is absent in the detectable area of the coupler B. In other words, the couplers A and C can detect the position of the coupler D. The position of the coupler D is present at an intersection x3 on concentric circles represented by a thin dotted line as4 and an alternate long and two short dashes line cs4 and is absent in the detectable area of the coupler B. Another intersection x4 is present in the detectable area of the coupler B and is a position where the coupler D is absent. This is equivalent to the case (3-2).

Figure 14:
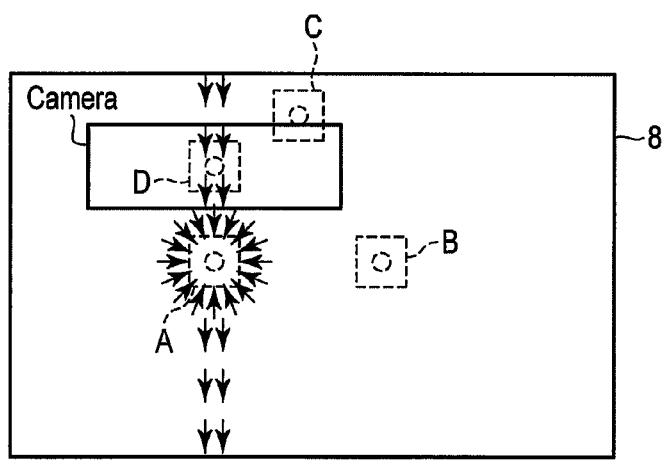
FIG. 14 is an exemplary diagram of a fourth movement pattern displayed on the display unit of the MFP according to the first embodiment.

FIG. 14 is an exemplary diagram of the fourth movement pattern displayed on the display unit 8 of the MFP 201 according to the first embodiment.

The fourth movement pattern is a movement pattern of the case (3-2) in which one position is calculated as the position of the coupler D. The figure indicating the target value is displayed in the position of the coupler A, which is a movement target position. Arrows are displayed toward the movement target position. The arrows are displayed along a line connecting one point (x3), at which the coupler D is considered to be present, and the target position. The user can easily set the coupler D in the target position by moving the camera in the direction of the arrows. Since it is unnecessary to bring the camera and the display unit 8 into contact with each other, the user can also visually recognize arrows displayed under the camera.

Figure 15A:
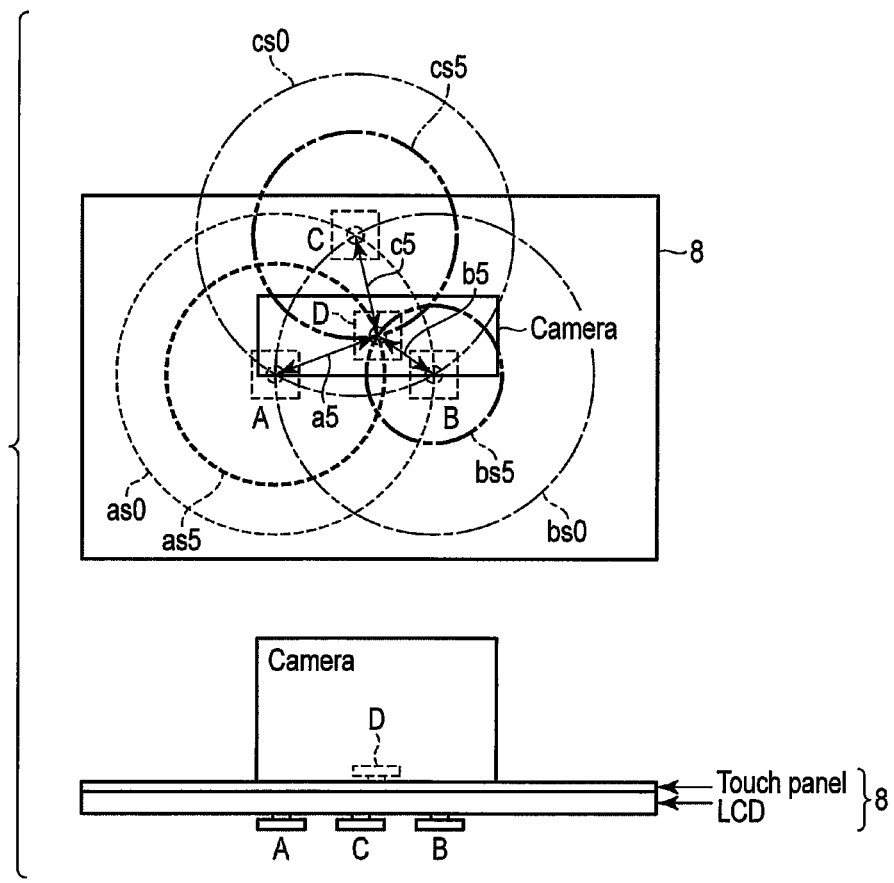
FIG. 15A is an exemplary diagram of a fourth case in which the position of the coupler of the device is detected by the MFP according to the first embodiment.

FIG. 15A is an exemplary diagram of the fourth case in which the position of the coupler D of the device 30 is detected by the MFP 201 according to the first embodiment.

In FIG. 15A, the distances between the coupler D of the camera, which is the device 30, and the couplers A, B, and C are respectively a5, b5, and c5. The detectable areas of the couplers A, B, and C are respectively represented by concentric circles of the dotted line as0, the alternate long and short dash line bs0, and the alternate long and two short dashes line cs0. The position of the coupler D of the camera, which is the device 30, is present in the detectable areas of the couplers A, B, and C. In other words, all the couplers A, B, and C can detect the position of the coupler D. As a result, the position of the coupler D is calculated as one point, which is an intersection on concentric circles represented by a thick dotted line as5, an alternate long and short dash line bs5, and an alternate long and two short dashes line cs5.

Figure 15B:
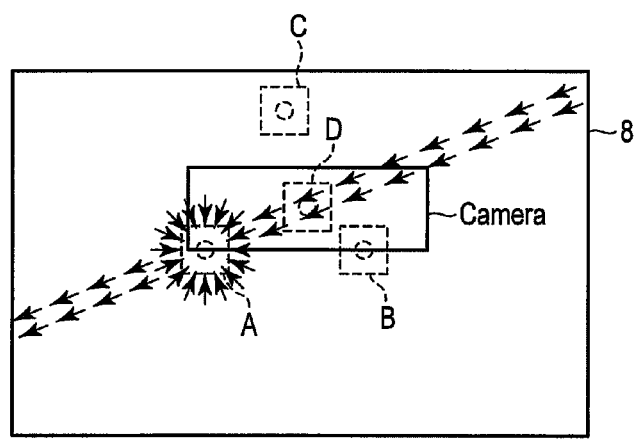
FIG. 15B is an exemplary diagram of the fourth pattern displayed on the display unit of the MFP according to the first embodiment.

FIG. 15B is an exemplary diagram of the fourth movement pattern displayed on the display unit 8 of the MFP 201 according to the first embodiment.

A movement pattern of the fourth case is the same as the fourth movement pattern shown in FIG. 14. Since the fourth movement pattern is already explained, redundant explanation is omitted.

The length of the arrows of the movement pattern may be changed according to a distance between the position of the coupler D and a target position. For example, if the distance is large, long arrows may be displayed and, if the distance is small, short arrows may be displayed.

FIG. 16 is an exemplary diagram of a display pattern in a movement end state displayed on the display unit 8 of the MFP 201 according to the first embodiment.

If the signal intensity of the coupler D detected by the coupler A is equal to or larger than a predetermined value, the MFP 201 displays a movement end pattern on the display unit 8. For example, the MFP 201 erases the display of the figure indicating the target value and the arrows and displays characters or a figure representing the completion of the movement. A position of the display unit 8 where the device 30 is absent is selected to display the characters or the figure. In FIG. 16, a lower right area of the display unit 8 is used for display.

FIG. 17 is an exemplary block diagram of the configuration of a control system for the short-range wireless communication between the MFP 201 according to the first embodiment and the device 30.

In the MFP 201, the control unit 10 controls a control circuit of the short-range wireless communication device 20 and controls transmission and reception of radio signals of the couplers A, B, and C. The control unit 10 controls an LCD control circuit to display a movement pattern or the like on the LCD and controls a touch panel control circuit to acquire input information from the touch panel. In the device 30, a control unit 31 controls a control circuit of a shot-range wireless communication device and controls transmission and reception of a radio signal of the coupler D. Data transfer between the MFP 201 and the device 30 is performed through radio wave transmission and reception between the couplers A, B, and C on the MFP side and the coupler D on the device side. Details of the data transfer are explained later.

Figure 18:
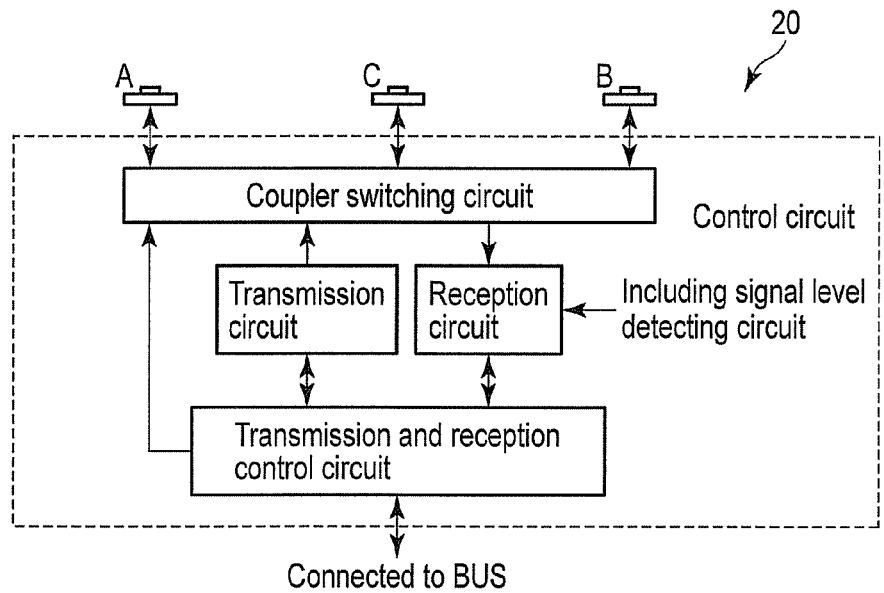
FIG. 18 is an exemplary block diagram of a detailed configuration of a short-range wireless communication device of the MFP according to the first embodiment.

FIG. 18 is an exemplary block diagram of a detailed configuration of the short-range wireless communication device 20 of the MFP 201 according to the first embodiment.

A transmission and reception control circuit provided in the short-range wireless communication device 20 receives a signal from the control unit 10 through a bus and controls a state of the couplers and controls switching of the couplers. A coupler switching circuit receives a switching signal from the transmission and reception control circuit and switches the couplers A, B, and C in use. A transmission circuit and a reception circuit are controlled by the transmission and reception control circuit and set the couplers in use in a transmission state, a reception state, or a nonuse state.

A schematic procedure of position detection processing is explained below with reference to FIGS. 19 to 21. The processing explained below is processing concerning a main function of a position detection processing function. Therefore, even a function not described in the following explanation is included in the position detection processing function if the function is explained with reference to FIGS. 1 to 18.

Figure 19:
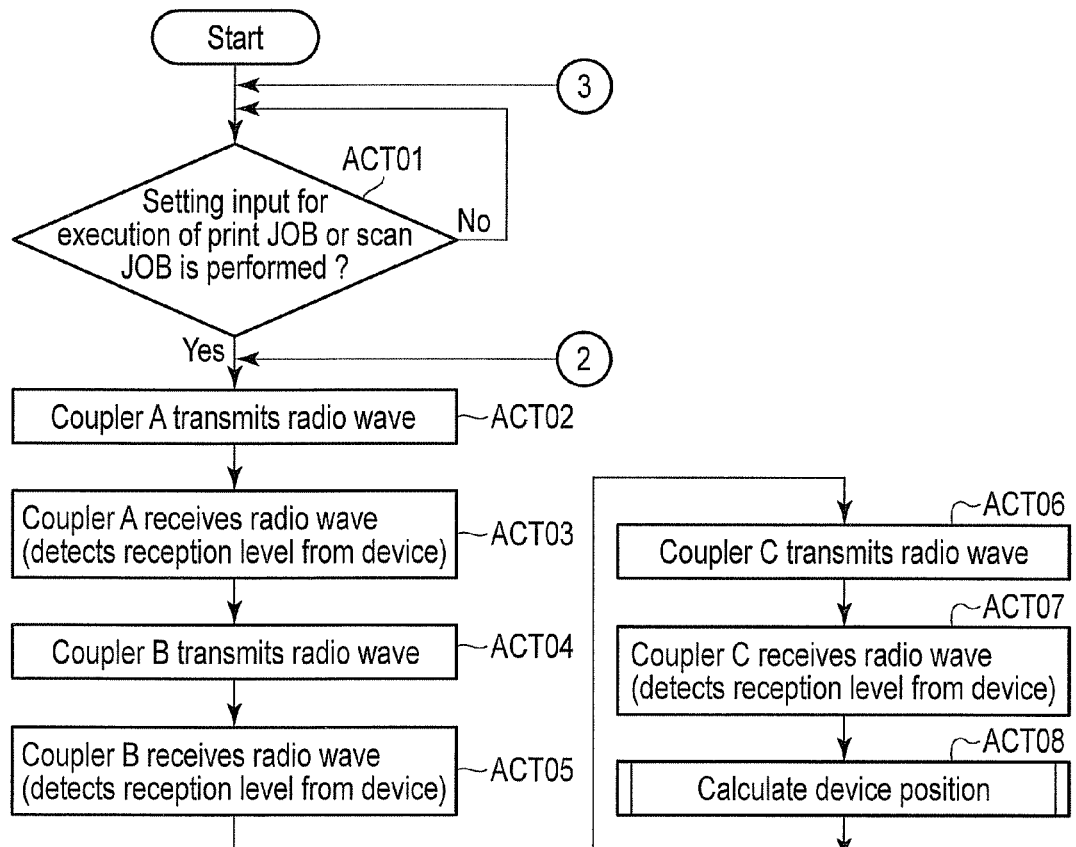
FIG. 19 is an exemplary flowchart for explaining a position detection processing procedure of the MFP according to the first embodiment.
Figure 20:
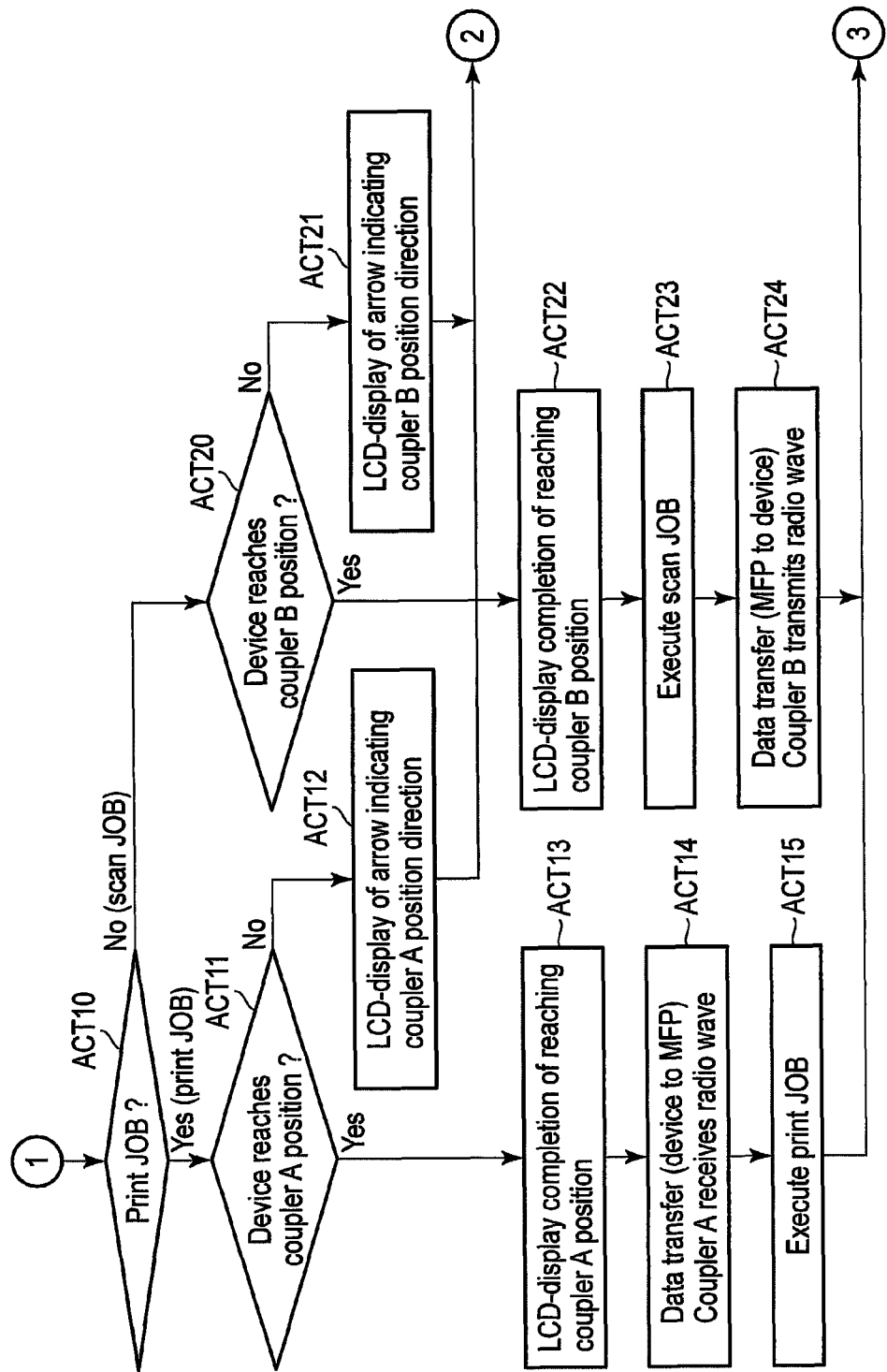
FIG. 20 is an exemplary flowchart for explaining the position detection processing procedure of the MFP according to the first embodiment.

FIGS. 19 and 20 are exemplary flowcharts for explaining the position detection processing procedure of the MFP 201 according to the first embodiment.

In ACT 01, the control unit 10 stays on standby until setting input for executing a print job or a scan job is performed (No in ACT 01).

The user depresses the scan button 17d or the copy button 17e on the operation panel 9. The control unit 10 displays a sub-menu on the display unit 8. The sub-menu includes an icon for acquiring information from the device 30 through the short-range wireless communication. If the user places the device 30 on the display unit 8 of the operation panel 9 and presses the icon (Yes in ACT 01), the control unit 10 executes processing in ACT 02 and subsequent acts.

In ACT 02, the coupler A of the short-range wireless communication device 20 transmits a radio wave transmission request to the device 30. In ACT 03, the coupler A receives a response radio wave from the device 30 and detects a reception level of the radio wave from the device 30.

In ACT 04, the coupler B of the short-range wireless communication device 20 transmits a radio wave transmission request to the device 30. In ACT 05, the coupler B receives a response radio wave from the device 30 and detects a reception level of the radio wave from the device 30.

In ACT 06, the coupler C of the short-range wireless communication device 20 transmits a radio wave transmission request to the device 30. In ACT 07, the coupler C receives a response radio wave from the device 30 and detects a reception level of the radio wave from the device 30.

In ACT 08, the control unit 10 calculates the position of the device 30 from the reception levels of the couplers A, B, and C. Since the method of the position calculation is already explained, detailed explanation of the method is omitted.

In ACT 10 of FIG. 20, the control unit 10 determines setting input for execution of which of the print job or the scan job is performed. If the print job is set, the control unit 10 allocates the coupler A to execute communication with the device 30. If the scan job is set, the control unit 10 allocates the coupler B to execute communication with the device 30. The control unit 10 can arbitrarily set, without being limited to the example explained above, the coupler that executes communication with the device 30.

If the print job is set (Yes in ACT 10), in ACT 11, the control unit 10 determines whether the device 30 reaches the position of the coupler A. If the device 30 does not reach the position of the coupler A (No in ACT 11), the control unit 10 displays, on the display unit 8, an arrow indicating the direction of the coupler A from the position of the device 30. The control unit 10 returns to ACT 02 of FIG. 19 and repeatedly executes the processing according to the movement of the device 30 until the device 30 reaches the position of the coupler A.

If the device 30 reaches the position of the coupler A (Yes in ACT 11), in ACT 13, the control unit 10 performs movement end display on the display unit 8 to indicate that the device 30 reaches the position of the coupler A. Since the movement end display is already explained, redundant explanation is omitted.

The user starts, from the sub-menu of the operation panel 9, operation for acquiring data. In ACT 14, the control unit 10 acquires data from the device 30 through the short-range wireless communication via the coupler A.

If the user selects the acquired data and depresses a start button of the operation panel 9, in ACT 15, the control unit 10 executes the print job. After executing the print job, the control unit 10 returns to ACT 01 of FIG. 19 and stands by for the next operation input.

If the scan job is set (No in ACT 10), in ACT 20, the control unit 10 determines whether the device 30 reaches the position of the coupler B. If the device 30 does not reach the position of the coupler B (No in ACT 20), the control unit 10 displays, on the display unit 8, an arrow indicating the direction of the coupler B from the position of the device 30. The control unit 10 returns to ACT 02 of FIG. 19 and repeatedly executes the processing according to the movement of the device 30 until the device 30 reaches the position of the coupler B.

If the device 30 reaches the position of the coupler B (Yes in ACT 20), in ACT 22, the control unit 10 performs movement end display on the display unit 8 to indicate that the device 30 reaches the position of the coupler B. Since the movement end display is already explained, redundant explanation is omitted.

If the user sets an original document in the auto feed unit 7 and depresses the start button of the operation panel 9, in ACT 23, the scan job is started. Specifically, the scanning unit 5 reads the original document and converts the original document into image data.

The user executes, from the sub-menu of the operation panel 9, operation for delivering data. In ACT 24, the control unit 10 transmits data to the device 30 through the short-range wireless communication via the coupler B. After delivering data, the control unit 10 returns to ACT 01 of FIG. 19 and stands by for the next operation input.

FIG. 21 is an exemplary flowchart for explaining a short-range wireless communication operation procedure of the device 30 in the first embodiment.

The user sets a mode of the device 30 to a mode for performing exchange of data through the short-range wireless communication.

In ACT 30, the control unit 31 of the device 30 stays on standby until setting input for the external MFP 201 to execute the print job or the scan job is performed (NO in ACT 30). If the setting input is performed, the control unit 31 executes processing in ACT 31 and subsequent acts.

In ACT 31, the control unit 31 receives data from the couplers A, B, and C of the MFP 201 through the short-range wireless communication via the coupler D of the device 30.

In ACT 32, the control unit 31 checks whether the received data is a reception level detection request (a radio wave transmission request) from the MFP 201. If the received data is the radio wave transmission request (Yes in ACT 32), in ACT 33, the control unit 31 transmits a predetermined radio wave via the coupler D. The control unit 31 returns to ACT 30 and stands by for the next data reception.

If the received data is not the radio wave transmission request (No in ACT 32), in ACT 34, the control unit 31 checks whether the received data is a transmission request for print job data from the MFP 201. If the received data is the transmission request for print job data (Yes in ACT 34), in ACT 35, the control unit 31 transmits the print job data via the coupler D. The control unit 31 returns to ACT 30 and stands by for the next data reception.

If the received data is not the transmission request for print job data (No in ACT 34), in ACT 36, the control unit 31 checks whether the received data is a reception request for scan job data from the MFP 201. If the received data is the reception request for scan job data (Yes in ACT 36), in ACT 37, the control unit 31 receives scan job data via the coupler D. The control unit 31 returns to Act 30 and stands by for the next data reception. If the received data is not the reception request for the scan job data (No in ACT 36), the control unit 31 returns to ACT 30 and stands by for the next data reception.

By combining the operations of the MFP 201 and the device 30 shown in FIGS. 19 to 21, it is possible to perform alignment through the short-range wireless communication between the MFP 201 and the device 30.

Second Embodiment

A second embodiment is different from the first embodiment in that the couplers A, B, and C are provided in a cradle 35. Components same as those in the first embodiment are denoted by the same reference numerals and signs and detailed explanation of the components is omitted.

Figure 22:
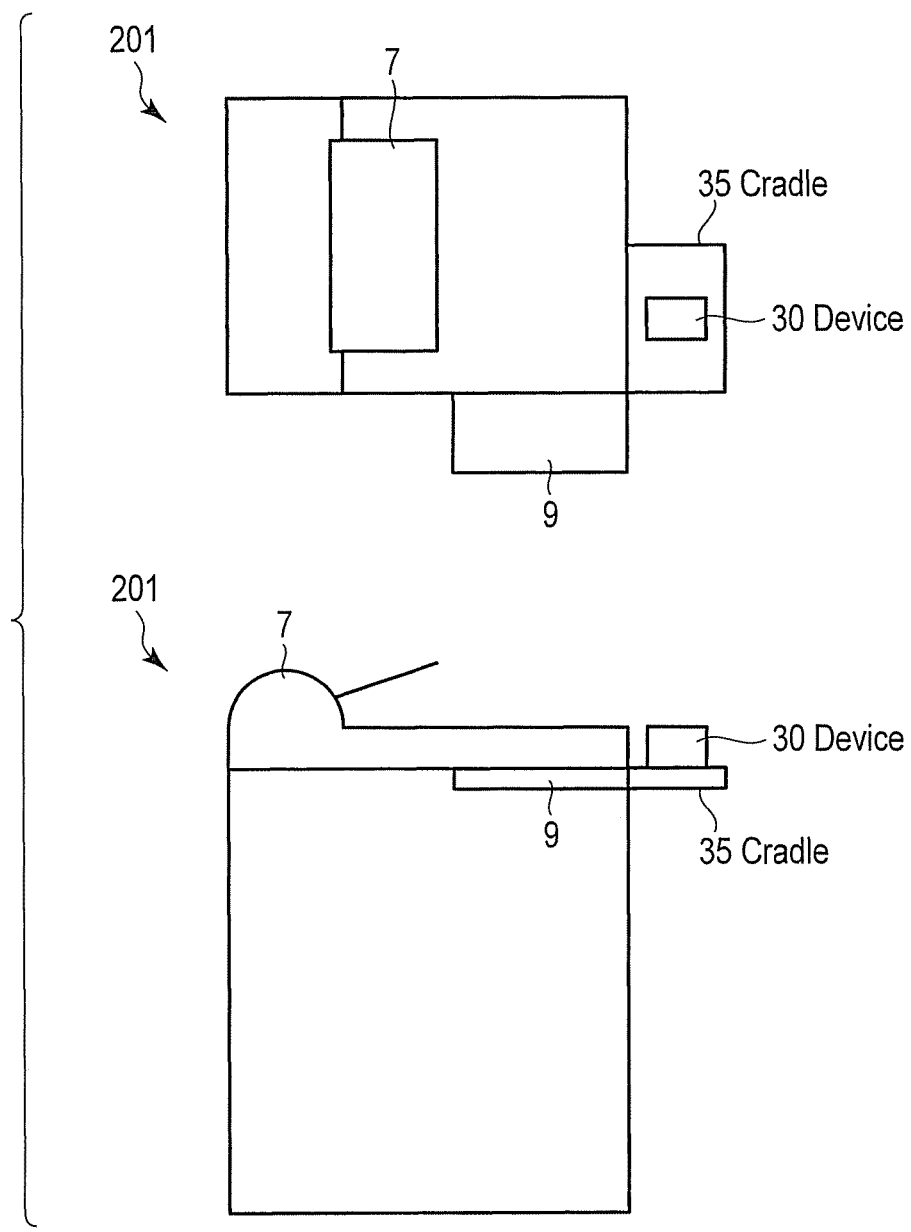
FIG. 22 is an exemplary diagram of a schematic configuration of an MFP according to a second embodiment.

FIG. 22 is an exemplary diagram of a schematic configuration of the MFP 201 according to the second embodiment.

The cradle 35 is provided in the MFP 201. The three couplers A, B, and C are provided on a rear surface of the cradle 35. A user moves the device 30 on the cradle 35. The MFP 201 calculates the position of the device 30 on the cradle 35 from the signal intensity of the coupler D of the device 30 detected by the couplers A, B, and C. The MFP 201 displays, on the display unit 8 of the operation panel 9, a direction in which the device 30 is moved. Since a method of calculating the position of the device 30 and a method of displaying the moving direction of the device 30 are the same as those in the first embodiment, detailed explanation of the methods is omitted.

EFFECTS OF THE EMBODIMENTS

According to the embodiments explained above, various effects can be realized.

In the embodiments, the position of the device is calculated by the short-range wireless communication system using the couplers A, B, and C and a direction in which the device is moved is displayed by an arrow on the display device to correspond to the calculated position. The arrow accurately guides a moving direction to a target position according to the movement of the device. Therefore, the user can easily move the device to a desired position.

In the first embodiment, the couplers are provided on the rear surface of the display device and the user moves the device on the front surface of the display device. Therefore, even in an MFP having only a small space, it is possible to easily realize exchange of data by the short-range wireless communication.

In the second embodiment, the couplers are provided on the rear surface of the cradle and the user moves the device on the surface of the cradle. A direction in which the device is moved is displayed on the display device provided near the cradle. Therefore, visibility concerning the device moving direction is improved.

In the embodiments, the example of the application of the present invention to the image forming apparatus is explained. However, the present invention is not limited to this form and can be applied to a general apparatus including a display device.

The functions explained in the embodiments may be configured using hardware. A computer program describing the functions using software may be realized by causing a computer to read the computer program. The functions may be configured by selecting the software or the hardware as appropriate.

Further, the functions can also be realized by causing the computer to read a computer program stored in a not-shown recording medium. A recording form of the recording medium may be any form as long as the recording medium can record the computer program and can be read by the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position detecting apparatus including a display device comprising:
   three receiving units provided on a rear surface side of the display device and configured to receive a radio signal from a device provided on a front surface side of the display device;
   an intensity detecting device configured to detect intensity of the radio signal from the device received by the receiving units; and
   a control unit configured to calculate a position of the device from the intensity of the radio signal received by the receiving units and display, on the display device, a guide screen for aligning the device with specific one receiving unit.

2. The apparatus according to claim 1, wherein the guide screen displays an arrow indicating a direction in which the device is moved to an aligning position where the device is aligned with the specific receiving unit.

3. The apparatus according to claim 2, wherein length of the arrow is larger as a distance in which the device is moved is larger.

4. The apparatus according to claim 2, wherein, if none of the receiving units can detect the radio signal from the device, the guide screen displays arrows from an entire circumference of the aligning position toward the position.

5. The apparatus according to claim 2, wherein, if one of the receiving units detects the radio signal from the device, the guide screen displays the arrow in an area of a fan shape around the aligning position where the device could be present.

6. The apparatus according to claim 1, wherein the control unit periodically updates the guide screen and displays the guide screen on the display device.

7. The apparatus according to claim 6, wherein, if intensity of a radio wave received by the specific receiving unit is larger than a predetermined value, the control unit displays information representing an alignment end on the guide screen.

8. The apparatus according to claim 1, wherein the control unit outputs a signal transmission request to the device and calculates a position of the device on the basis of intensity of a radio signal transmitted from the device in response to the request.

9. The apparatus according to claim 1, wherein
the position detecting apparatus is an image forming apparatus, and
the display device is an operation panel.

10. An image forming apparatus comprising:
an operation panel including a display unit;
a cradle;
three receiving units provided on a rear surface side of the cradle and configured to receive a radio signal from a device provided on a front surface side of the cradle;
an intensity detecting device configured to detect intensity of the radio signal from the device received by the receiving units; and
a control unit configured to calculate a position of the device from the intensity of the radio signal received by the receiving units and display, on the display unit, a guide screen for aligning the device with specific one receiving unit.

11. The apparatus according to claim 10, wherein the guide screen displays an arrow indicating a direction in which the device is moved to an aligning position where the device is aligned with the specific receiving unit.

12. The apparatus according to claim 11, wherein length of the arrow is larger as a distance in which the device is moved is larger.

13. The apparatus according to claim 11, wherein, if none of the receiving units can detect the radio signal from the device, the guide screen displays arrows from an entire circumference of the aligning position toward the position.

14. The apparatus according to claim 11, wherein, if one of the receiving units detects the radio signal from the device, the guide screen displays the arrow in an area of a fan shape around the aligning position where the device could be present.

15. The apparatus according to claim 10, wherein the control unit periodically updates the guide screen and displays the guide screen on the display unit.

16. The apparatus according to claim 15, wherein, if intensity of a radio wave received by the specific receiving unit is larger than a predetermined value, the control unit displays information representing an alignment end on the guide screen.

17. The apparatus according to claim 10, wherein the control unit outputs a signal transmission request to the device and calculates a position of the device on the basis of intensity of a radio signal transmitted from the device in response to the request.

18. A position detecting method for a position detecting apparatus including a display device, comprising:
providing three receiving units on a rear surface side of the display device;
receiving, using the receiving units, a radio signal from a device provided on a front surface side of the display device;
detecting intensity of the radio signal from the device received by the receiving units;
calculating a position of the device from the intensity of the radio signal received by the receiving units; and
displaying, on the display device, a guide screen for aligning the device with specific one receiving unit.

19. The method according to claim 18, wherein the guide screen displays an arrow indicating a direction in which the device is moved to an aligning position where the device is aligned with the specific receiving unit.

\* \* \* \* \*